United States Patent [19]

Hoffmüller

[11] Patent Number: 5,103,559
[45] Date of Patent: Apr. 14, 1992

[54] METHOD FOR MAKING HEAT EXCHANGER HAVING AT LEAST TWO COLLECTING PIPES

[75] Inventor: Wilhelm Hoffmüller, Munich, Fed. Rep. of Germany

[73] Assignee: MTU Motoren- und Turbinen-Union Munchen GmbH, Fed. Rep. of Germany

[21] Appl. No.: 518,419

[22] Filed: May 3, 1990

[30] Foreign Application Priority Data

May 5, 1989 [DE] Fed. Rep. of Germany ....... 3914773

[51] Int. Cl.⁵ .................................................. F28F 9/02
[52] U.S. Cl. .............................. 29/890.036; 29/890.04; 29/458
[58] Field of Search ............... 29/890.036, 890.04, 29/890.039, 458, 463, 527.4; 228/183; 165/173, 175, 176

[56] References Cited

U.S. PATENT DOCUMENTS

| | | |
|---|---|---|
| 1,743,877 | 1/1930 | Broido . |
| 1,854,340 | 4/1932 | Langvand . |
| 2,983,167 | 5/1961 | Huet . |
| 3,133,659 | 5/1964 | Dobell . |
| 3,431,949 | 3/1969 | Uto . |
| 3,688,372 | 9/1972 | Frost . |
| 3,710,858 | 1/1973 | Young . |
| 3,785,040 | 1/1974 | Pechacek . |
| 4,211,278 | 7/1980 | Bennett et al. ................... 228/183 |
| 4,227,393 | 10/1980 | McElhaney . |
| 4,428,420 | 1/1984 | Blakely ............................ 228/183 |
| 4,505,419 | 3/1985 | Steeb ............................... 228/183 |
| 4,800,955 | 1/1989 | Hagemeister et al. ......... 165/176 X |
| 4,893,674 | 1/1990 | Hagemeister ................. 29/890.04 X |
| 4,940,084 | 7/1990 | Grieb ........................... 165/176 X |
| 4,969,510 | 11/1990 | Greune .......................... 165/176 X |

FOREIGN PATENT DOCUMENTS

| | | |
|---|---|---|
| 0022234 | 6/1980 | European Pat. Off. . |
| 0313038 | 10/1988 | European Pat. Off. . |
| 48544 | of 1888 | Fed. Rep. of Germany . |
| 3636762 | 10/1986 | Fed. Rep. of Germany . |
| 3722329 | 7/1987 | Fed. Rep. of Germany . |
| 1295224 | 11/1972 | United Kingdom . |
| 2130356 | 5/1984 | United Kingdom ............... 165/173 |

*Primary Examiner*—Irene Cuda
*Attorney, Agent, or Firm*—Evenson, Wands, Edwards, Lenahan & McKeown

[57] ABSTRACT

A heat exchanger has two collecting pipes and a streamlined-section tube matrix connected with these two pipes. The collecting pipes comprise several thin sheet metal shells connected with one another which permits simplified and higher speed manufacture of the collecting pipes, particularly since manufacture of cutouts in the collecting pipes for fitting through the small streamlined-section tubes, which is otherwise very time-consuming, can be significantly simplified.

2 Claims, 3 Drawing Sheets

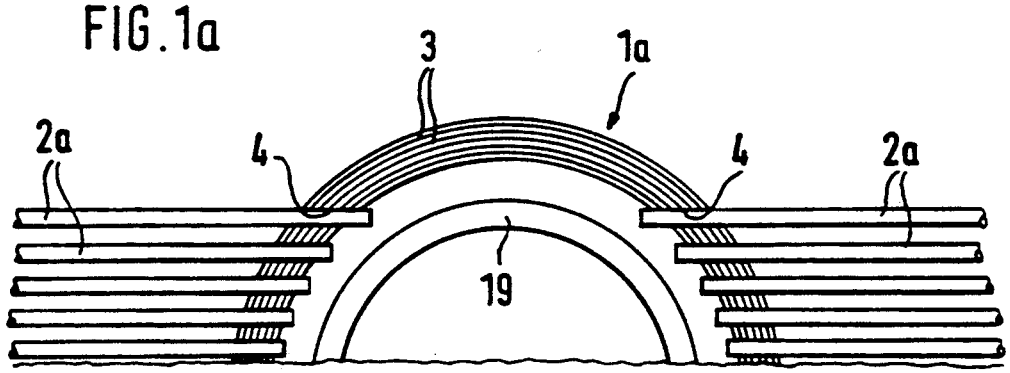
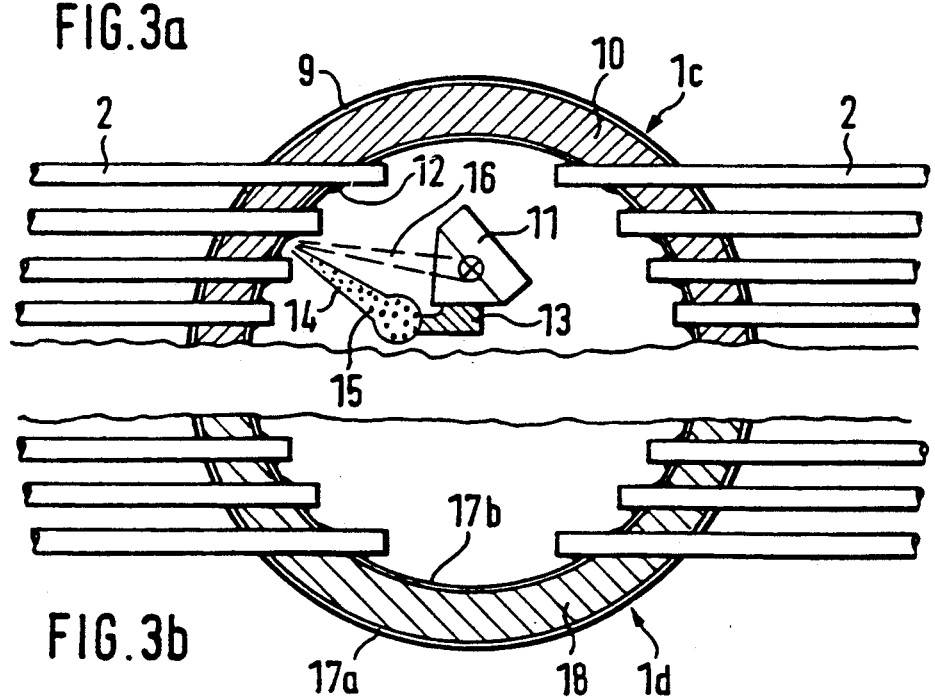

METHOD FOR MAKING HEAT EXCHANGER HAVING AT LEAST TWO COLLECTING PIPES

BACKGROUND AND SUMMARY OF THE INVENTION

The invention relates to a heat exchanger having at least two collecting pipes connected with one another by a plurality of small regularly spaced streamlined-section tubes and a method of making same. More particularly, the present invention relates to a heat exchanger which can be manufactured at more reasonable costs.

A heat exchanger having at least two collecting pipes is shown, for example, in DE-PS 36 36 762 where the collecting pipes have a plurality of cutouts for receiving small streamlined-section tubes. In order to achieve a good rate of heat exchange, it is necessary to provide a very large number of small streamlined-section tubes which may be in the range of several thousand. The disadvantage of these known heat exchangers is that the cutting of thousands of cutouts out of the massive walls of the pipes by electro-chemical processes, requires hundreds of production hours.

A collecting pipe utilizing concentric sleeves with a material layer inserted therebetween is shown in DE-PS 37 22 329. There, a sinterable powder for the formation of the collecting pipe wall is poured between two molding shells. The removal of the molding shells on the streamlined-section tube side disadvantageously entails considerable expenditures. Moreover, because of deviations of the actual density from the theoretically achievable density, hollow spaces may exist through which leakage currents may flow to the outside.

It is an object of the present invention to provide such a heat exchanger which can be manufactured faster and at more reasonable cost.

It is also an object of the present invention to provide a manufacturing process for this type of a heat exchanger in which, for example, sheet metal sleeves become a component of the heat exchanger collecting pipe being manufactured, and interior and exterior surfaces thereof are absolutely gastight.

The foregoing objects have been achieved by connecting layers of sheet metal to form the collecting pipes which then consist either of a thin outer sheet metal sleeve with a material layer of the thickness of the collecting pipe wall applied on the inside or two concentric sheet metal sleeves between which a material layer is inserted.

It is an advantage of the present invention that the individual, relatively thin sheet metal layers can be provided with cutouts in a simple manner such as, for example, by mechanical punching, and subsequently, the individual sheet metal layers can be connected with one another with their cutouts aligned with one another. The individual machining of thin sheet metal layers in this case is significantly simpler than a machining of massive collecting pipes with a wall thickness which, depending on the overall size and the pressure difference, is between 5 and 15 mm.

When the cutouts of the thin sheet metal layers are mechanically punched, it is advantageously possible to avoid a sheet metal deformation, particularly with the cutouts located close together. It is also an advantage of the present invention that small heat exchanger tubes can be connected with the collecting pipes essentially without any warping.

According to one presently preferred embodiment of the present invention, each collecting pipe can comprise two axially joined half shells which are made of layers. The individual half shells can be made very easily by layering of sheet metal layers on one another. Compensation of moderately small tolerances with respect to the alignment of the cutouts can be made easily.

An alternative embodiment of the present invention provides that each collecting pipe is wound in several layers from a strip-shaped metal sheet. "Strip-shaped" means that the width of the strip corresponds to the length of the collecting pipe, while the strip length corresponds approximately to the collecting pipe circumference multiplied by the number of layers to be wound. The strip-shaped metal sheet, is provided advantageously before the winding operation either with a soldering layer or with a soldering foil with the same outside measurements wound between the sheet metal layers. The connection of the sheet metal layers in either case preferably takes place by a soldering-together. Thus, the solder is inserted between the individual sheet metal layers either as a solder foil with a thickness of approximately 3 to 10/100 mm, or the solder is applied directly to one or both sides of the metal sheets. After the sheet metal layers are placed on one another and are aligned, they are joined by being heated in a furnace.

The thickness of the sheet metal layers is preferably between 0.2 and 1 mm. A thickness 0.5 mm has been found to be particularly suitable because a mechanical punching-out operation can take place without any undesirable deformation while, at the same time, the number of sheet metal layers which have to be connected is not excessive. Any conventionally used steel or nickel alloy, such as Hastelloy X, C 263, X 10 CrNiTi 189, X 15 Cr Ni Si 2520, is suitable to be used for the sheet metal layers. Other deformable alloys are, however, also suitable for this purpose 10 to 30 sheet metal layers for forming the collecting pipes can be arranged above one another and are connected. In such a case, it is most suitable for the sheet metal layers to have a thickness of 1/10 to 1/20 of the collector pipe wall to be manufactured.

The advantage of the embodiment of the present invention utilizing this outer sheet metal sleeve with a material layer applied on the inside is that cutouts in the sheet metal outer shell are easy to produce. As a result, a significant shortening of the production process can also be achieved. The application of the material layer from the interior to the sheet metal outer sleeve can be carried out with high pressure by suitable programmed coating machines within a relatively short time with the small streamlined-section tubes situated relatively close to one another. Suitable coating processes are, for example, plasma spraying or plast spraying processes. During the applicating operation, the small streamlined-section tubes are preferably closed on the inside by stoppers in order to prevent the penetration of layer material into the interior of the small streamlined-section tubes and then are subsequently removed.

This embodiment utilizing two concentric sleeves with a material layer inserted therebetween provides a simple process for making the cutouts in the collecting pipes.

A presently preferred process for manufacturing a heat exchanger in accordance with the present invention includes bending sheet-metal sheets with an individually required radius, punching in cutouts for small streamlined-section tubes, providing a solder layer on at least one side of the sheets, stacking and aligning the sheets with respect to the cutouts, fitting the section tubes into the cutouts, and solder connecting the metal sheets.

An essential advantage of the above-described manufacturing process resides in the fact that the joining of the individual sheet metal layers takes place with a heat source arranged inside the collecting pipe being manufactured. The interior wall of the collecting pipe has a higher temperature than the exterior wall, and thus the thermal expansions are higher on the inside than on the outside which results in a connection of the sheet metal layers layered above one another without any gaps. Hence, no undesirable hollow spaces remain between the sheet metal layers. It is also an advantage of the process of the present invention that the relatively thin-walled small streamlined-section tubes outside the collecting pipe are not directly stressed by the high soldering temperature.

Another advantageous process for manufacturing a heat exchanger collecting pipe in accordance with the present invention involves winding a sheet metal strip of the required width onto a rotatable winding pin, along with a solderable foil, and punching cutouts from the interior of the winding pin through the strip against a counterpart mounted outside the wound sheet.

An essential advantage of this embodiment of the process is that very thin sheet metal layers in the form of foils can be used which have a thickness of up to 0.2 mm. The costs for punching-out of the streamlined-section tubes are thus low. A significant simplification of the process is also achieved in that, at the same time as the sheet metal strip is wound, a soldering foil can be wound in with it, and by means of suitable devices in the interior of the collecting pipe, during each turn, the cutouts may be punched into the outermost sheet metal layer.

An advantageous further development of the described manufacturing process is that the cutouts of the sheet metal layers disposed above one another are manufactured in a geometrically similar manner from the outside to the inside with increasing size such that the cutouts of the finished collecting pipes are constructed to be slightly conical. After the small streamlined-section tubes have been fitted into the cutouts, the remaining annular gaps between the small streamlined-section tubes and the collecting pipe wall are connected by a build-up welding process. This arrangement has the advantage that, on the one hand, high demands are not made on the tolerance of the cutouts being manufactured; as a result, the punching and manufacturing process may be simplified. Nevertheless, a firm and gastight joining becomes possible between the small streamlined-section tube and the collecting pipe.

In a preferred further embodiment of the present invention, an adjustable laser beam is directed and focused from the inside to the point of the collecting pipe being worked, and metal powder is sprayed onto this focusing point along with inert gas. "Adjustable" means in this instance that either the collecting pipe is fixed and the laser is aligned, for example, by way of adjustable mirrors and prisms, or the laser beam is aligned and the collecting pipe is connected with a robot which has the required axes of motion, for example, six axes of motion. Suitable inert gases are argon, $CO_2$, helium, or other known inert gases.

An advantage of the immediately-above described laser process is that the application process can be carried out under atmospheric conditions, after only the point being worked has been brought to a high temperature, while the rest of the component remains cool and is therefore not susceptible to oxidation. The melt-on depth achieved in this case amounts to approximately 0.05-0.2 mm, so that warping is avoided in the component. The supply of inert gas keeps the heated point free of oxygen so that there is no risk of oxidation. An alloyed powder consisting of Hastelloy X or C 263 with a particle size of approximately 60-120 $\mu$m has been found suitable for use as the metal powder.

BRIEF DESCRIPTION OF THE DRAWINGS

These and further features, objects and advantages of the present invention will become more apparent from the following detailed description of a presently preferred embodiment when taken in conjunction with the accompanying drawings wherein:

FIG. 1a is a partial cross-sectional view of a collecting pipe;

FIG. 1b is a partial cross-sectional view of another collecting pipe;

FIG. 3a is a partial cross-sectional view of another type of collecting pipe;

FIG. 3b is a partial cross-sectional view through still another collecting pipe;

FIG. 4 is a schematic sectional representation of a device for manufacturing the collecting pipe according to FIG. 1a;

DETAILED DESCRIPTION OF THE DRAWINGS

Figure 2:
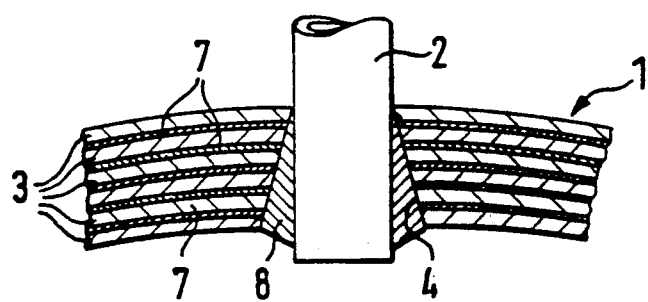
FIG. 2 is a sectional detail of a collecting pipe of the type shown in FIGS. 1a and 1b.

FIG. 1a shows a collecting pipe 1a of a heat exchanger at which small streamlined-section tubes 2a are mounted at two opposite wall sections. These small streamlined-section tubes 2a are preferably bent in a U-shape and, with their other end, are mounted at a second collecting pipe (not shown). In this embodiment, the collecting pipe 1a comprises a number of concentric cylindrical sheet metal layers 3 which are connected with one another by means of intermediate solder layers.

The small streamlined-section tubes 2a are pushed through form-adapted cutouts 4 (see FIG. 6) through the collecting pipe 1a and are soldered to it. A cylindrical heating device 19 heats from the inside the collecting pipe 1a to be manufactured and thereby joins together the sheet metal layers 3. This heating device 19 may also be used in the collecting pipe embodiments 1b (FIG. 1b), 1c (FIG. 3a) and 1d (FIG. 3b) for connecting the sheet metal layers 3 by intermediate solder layers 7 shown in FIG. 2.

The embodiment of FIG. 1b differs from that of FIG. 1a by the fact that collecting pipe 1b comprises two joined half shells 5a, 5b, in which case, these half shells 5a, 5b have fastening flanges 6 which are connected to one another by, for example, screws or other suitable joining devices. An additional difference is the fact that the small streamlined-section tubes 2b project farther into the interior of the collecting pipe 1b and are welded together with the innermost sheet metal layer 3b by a buildup welding process. This welding process may be in addition to the soldered connection between the small streamlined-section tube 2b and the wall of the collecting pipe 1b.

FIG. 2 is a sectional view showing that this collecting pipe 1 comprises several sheet metal layers 3 disposed above one another, with solder layers 7 provided between the sheet metal layers 3. The cutout 4 for the small streamlined-section tube 2 diverges conically toward the inside of the pipe such that, at the exterior wall of the collecting pipe 1, it corresponds to the size and the shape of the streamline section 2. An annular gap between the wall of the small streamlined-section tube 2 and the cutout 4 is filled in by a welding deposit 8 applied by the buildup welding method so that a firm connection can be achieved between the collecting pipe 1 and the small streamlined-section tube 2.

FIG. 3a shows another embodiment of the invention in which the collecting pipe 1c comprises an outer sheet metal sleeve 9 and a material layer 10 having the thickness of the collecting pipe to be manufactured which is applied to the inside of the sleeve 9. A buildup laser welding apparatus is also shown in which a laser beam aligned in the axial direction of the collecting pipe 1c, by virtue of the prism 11, is deflected to working point 12 and is focussed. The prism 11 is movably mounted to a holder 13. A nozzle 14 supplies the welding deposit 15 and inert gas to the working point 12 heated by the laser beam 16 and is also mounted at the holder 13.

The embodiment of FIG. 3b shows another collecting pipe 1d which is constructed of two concentric sheet metal sleeves 17a, 17b between which a sintered metal powder layer 18 is provided.

Figure 4:
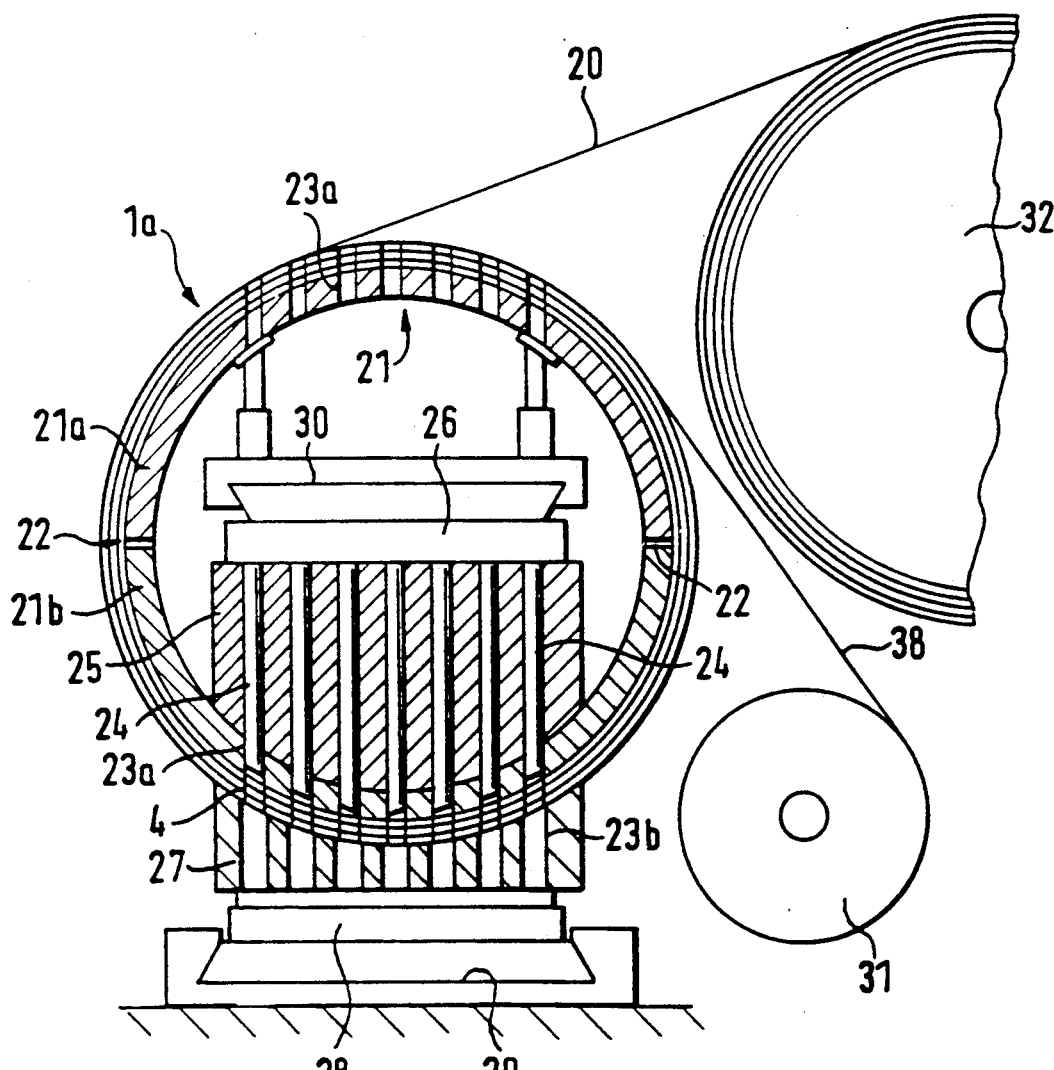

FIG. 4 is a cross-sectional schematic view of an apparatus for manufacturing a collecting pipe 1a which is wound from a sheet metal strip 20. A winding pin designated generally by the numeral 21 comprises two partial elements 21a, 21b and can be rotated in the circumferential direction. A gap 22 for removal of the finished collecting pipe 1a is provided between the elements 21a, 21b. One of the partial elements 21a, 21b is radially displaceable such that, for the removal of the completely wound collecting pipe, the gap 22 is closed. One partial element 21b is provided with a number of cutouts 23a which corresponds to the number and the position of the cutouts 4 to be made in the collecting pipe 1a. In alignment with the cutouts 23a, a row of punches 24 is provided which are axially displaceable in a guide 25 and can be moved in their axial direction by a common actuating device 26.

A counterpart 27 provided with cutouts 23b is arranged opposite the punches 24, with their edge on the collecting pipe outer side constituting blades. The cutouts 23b are in alignment with the cutouts 23a. A lifting mechanism 28 moves the counterpart 27 in the direction of the collecting pipe 1. The counterpart 27 and the lifting mechanism 28 can be moved together by a guide rail 29 vertically with respect to the plane of the sheet, i.e., into and out of the plane of the sheet. The actuating device 26 can also be moved in the same vertical direction with respect to the sheet plane by a second guide rail 30. Both the counterpart 27 and the actuating device 26 can be moved together such that the cutouts 23a, 23b or the punches 24 and the cutouts 23b are always aligned with one another. A solder foil storage roller 31 and a sheet metal strip storage roller 32 are rotatably disposed and are prestressed to the desired degree with the necessary tension.

Figure 5:
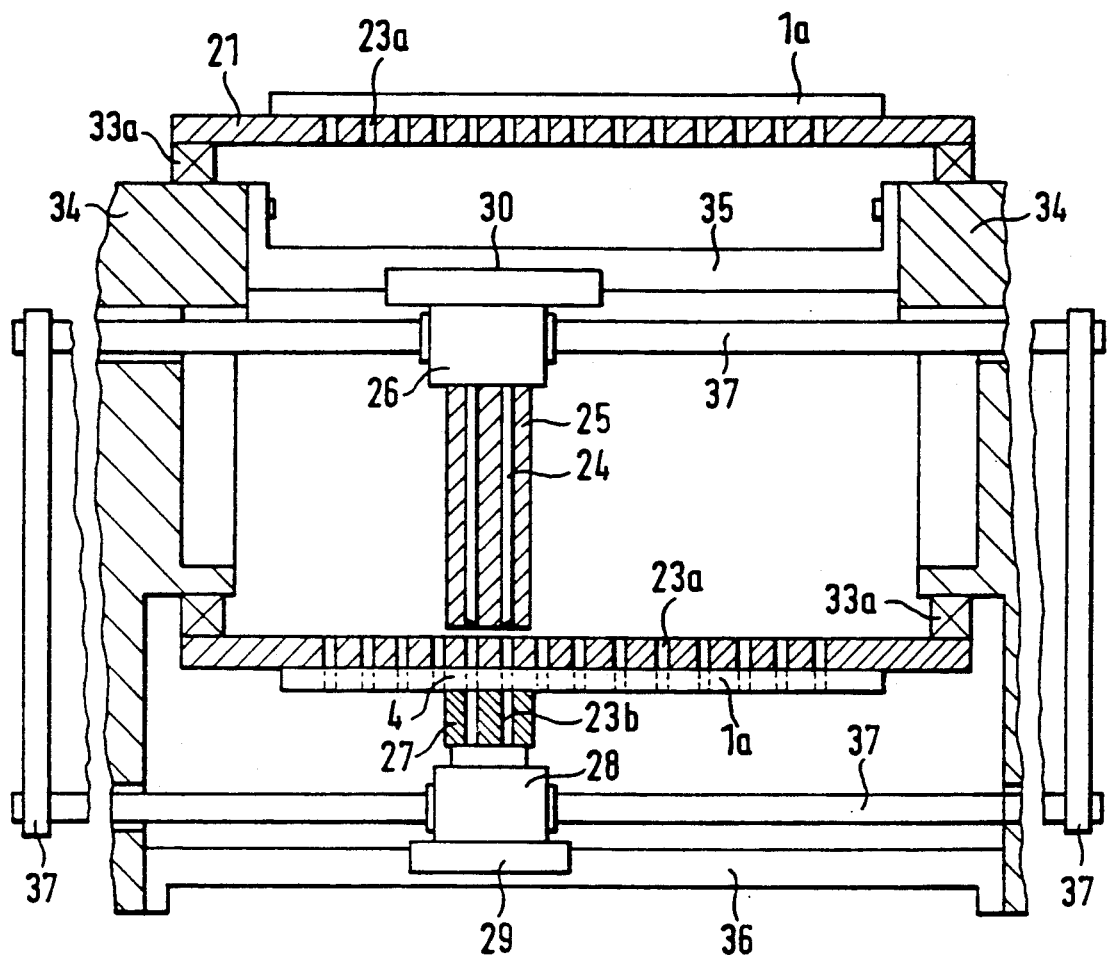
FIG. 5 is a longitudinal sectional view of the arrangement according to FIG. 4.

FIG. 5 is a longitudinal sectional view of the winding arrangement of FIG. 4. The collecting pipe 1a which is to be wound and provided with the cutouts is mounted on the sleeve-type winding pin 21 which, in turn, by way of bearings 33a, is rotatably mounted at a housing 34. The two partial elements 21a, 21b of the winding pin 21, along the course of the collecting pipe 1a to be manufactured, are provided with the cutouts 23a for the punches 24. Two rows of punches 24 together are guided in the guide 25 and, for the punching of the cutouts 4 in the collecting pipe 1a, are advanced by the actuating arrangement 26 through the cutouts 23 of the winding pin 21 into the cutouts 23b of the counterpart 27. In this case, cutouts 4 are punched by the blades of the punches 24 in the radially outermost sheet metal layer of the collecting pipe 1a. The cutouts 4 are in alignment with the cutouts of the sheet metal layers situated underneath. Subsequently, the two rows of punches 24 are moved back, and the guide 25 and the counterpart 27 together are displaced by a row of cutouts in the axial direction of the collecting pipe 1a, where the punching operation is repeated. For this purpose, the actuating device 26 of the punch guide 25 and the lifting mechanism 28 of the counterpart 27, by way of guide rails 29, 30, are slidably displaced via guide rails 29, 30 on supports 35, 36 supported on the housing 34. The guide 25 and the counterpart 27 are coupled with one another by connecting members 37 to achieve synchronous movement.

For manufacturing a collecting pipe 1a (see FIG. 4), one end of the sheet metal strip 20 is wound off the sheet metal strip storage roller 32 and is fastened to the winding pin 21, which may, for example, take place by fastening the end in one of the gaps 22. The winding pin 21, is then rotated by half a turn, with stops taking place in two positions which are 180° opposite. In this position, the counterpart 27 is pressed against the first sheet metal layer of the collecting pipe 1a, and the punches 24 are advanced for punching out the first row of cutouts 4. Subsequently, the punches 24 are moved back, and the actuating device 26 is moved farther along the guide rail 30 together with the counterpart 27 by one row of cutouts 23a. The punching operation is repeated until all cutouts 4 are punched out on one side of the collecting pipe 1a. Subsequently, the winding pin 21 is rotated farther by half a turn and the operation is repeated in the same manner on the other side of the collecting pipe which is now disposed next to the counterpart 27.

After the first layer of the sheet metal strip 20 has been wound onto the winding pin 21, a soldering foil 38 of the same width is fastened to this winding pin 21. Subsequently, at intervals of one half turn of the winding pin, respectively, the turning continues until the required number of sheet metal layers are wound onto the winding pin 21. Two interruptions take place in each turn of the winding pin 21 in order to carry out the above-described punching operation. Since the outer radius of the collecting pipe 1a being wound grows with each sheet metal layer, it is necessary that the cutouts 23b in the counterpart 27 for the formation of precise punching edges, precisely match the sheet metal contour or the cutting punches 24. Thus, an adaptation of the counterpart 27 is also required and may take place by exchanging the counterpart 27 and/or punches 24 at each winding layer. It is also within the contemplation of the present invention to provide for this adaptation a row of counterparts 27 one behind another and individually provided with lifting arrangements 28 so that the individual counterparts 27 can be moved up depending on the proportion of the wound sheet metal layers. It is advantageous to coordinate the entire arrangement, i.e., the movement of the winding pin 21, the actuating arrangement 26, the lifting arrangement 28 and the movement by way of the guide rail 29, 30, by a central computer.

Figure 6:
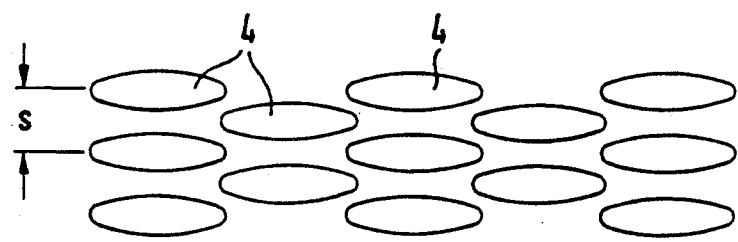
FIG. 6 is a schematic view of the arrangement of the cutouts.

FIG. 6 shows the arrangement of the cutouts 4. The hatched offset cutouts 4 are punched out in one operation by means of the two rows of punches 24 shown in FIG. 5. Subsequently, the guide 25 is advanced by the distance s, and the next two rows of zigzag-type or offset cutouts 4 are punched out.

Although the invention has been described and illustrated in detail, it is to be clearly understood that the same is by way of illustration and example, and is not to be taken by way of limitation. The spirit and scope of the present invention are to be limited only by the terms of the appended claims

I claim:

1. A process for manufacturing a heat exchanger having at least two collecting pipes connected with one another by a plurality of small streamlined-section tubes and comprising several connected sheet metal layers, including the steps of
    a) cutting out and bending the sheet metal layers in a plane with an individually required radius;
    b) punching in the layers cutouts for the small streamlined-section tubes;
    c) providing the sheet metal layers with a solder layer at least on one side thereof;
    d) stacking and aligning the sheet metal layers above one another such that the cutouts are aligned;
    e) fitting and fastening the small streamlined-section tubes into the cutouts; and
    f) applying a soldering temperature with a heat source radially from the inside of the collecting pipes until the layers are connected.

2. The process according to claim 1, wherein the step of punching the cutouts includes disposing the cutouts above one another in a geometrically similar manner from the outside to the inside with increasing size such that the cutouts define conical openings in the collecting pipes and, after the step of fitting and fastening the small streamlined-section tubes, in the cutouts, buildup welding the small streamlined-section tubes for connection with the collecting pipe.

* * * * *